J. W. BALDWIN.
Ash-Sifter.
No. 203,697. Patented May 14, 1878.
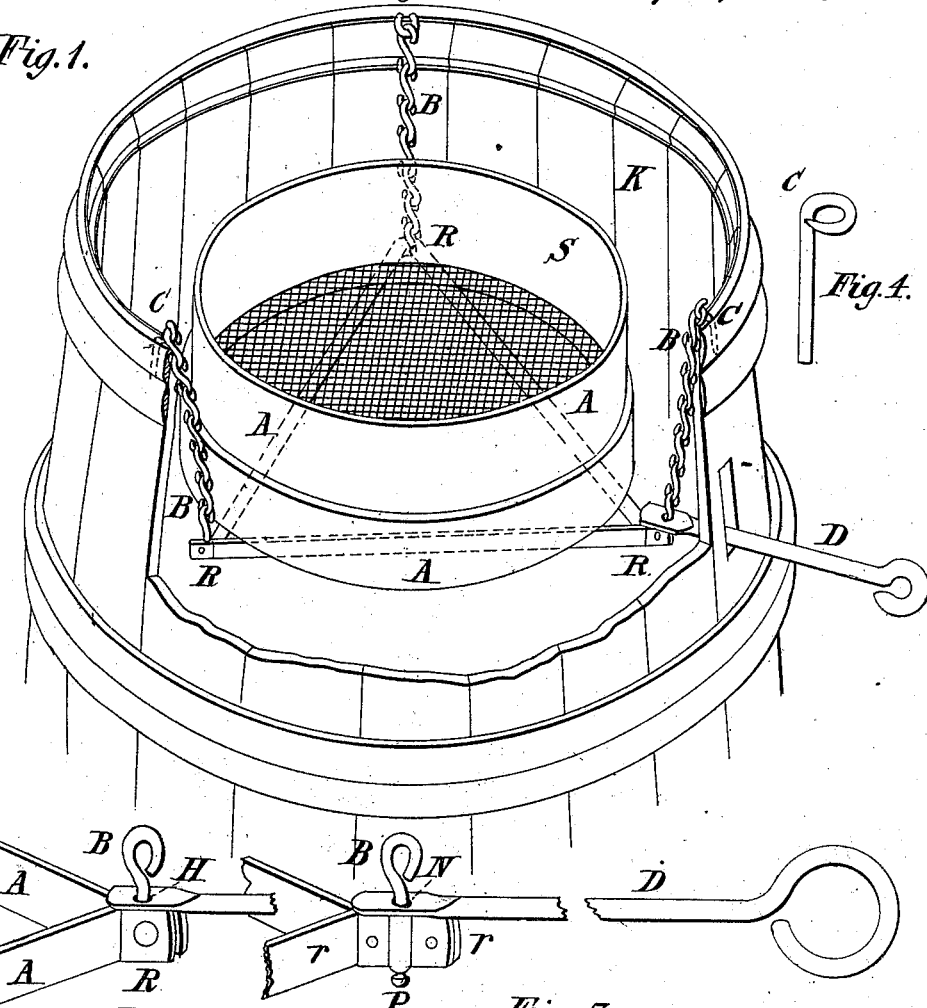
Fig. 1.
Fig. 4.
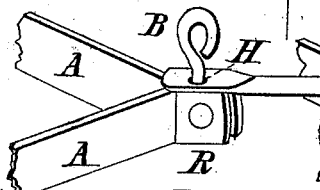
Fig. 2.
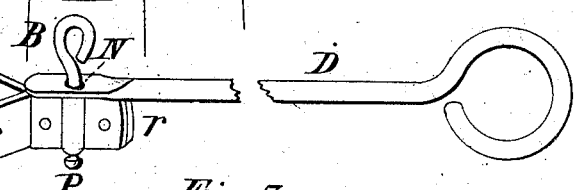
Fig. 3.
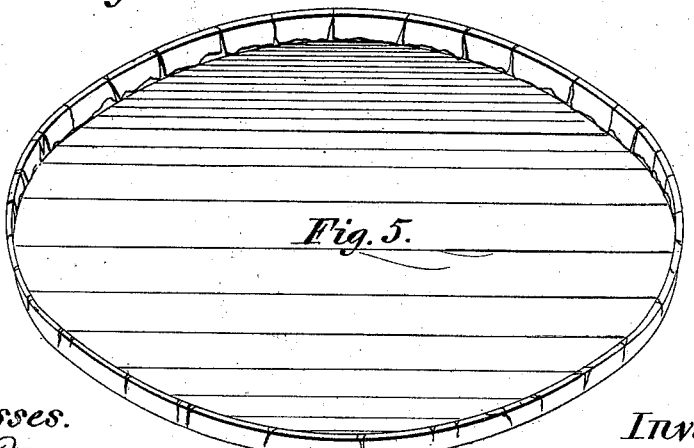
Fig. 5.
Witnesses.
S. W. Putnam
Geo. S. Putnam
Inventor.
John W. Baldwin

UNITED STATES PATENT OFFICE.

JOHN W. BALDWIN, OF FITCHBURG, MASSACHUSETTS.

IMPROVEMENT IN ASH-SIFTERS.

Specification forming part of Letters Patent No. 203,697, dated May 14, 1878; application filed February 6, 1878.

*To all whom it may concern:*

Be it known that I, J. W. BALDWIN, of Fitchburg, in the county of Worcester and State of Massachusetts, have invented a new and useful Improvement in Ash-Sifters, which improvement is fully set forth in the following specification, reference being had to the accompanying drawings.

The object of my invention is to supply a more ready and efficient mode of using the common round sieve S, as shown in the perspective view, Figure 1, of the accompanying drawing, in sifting coal-ashes, which shall exclude, as far as possible, all objectionable features.

To accomplish this object, the sieve is made to rest upon a frame of triangular form, the ribs of which are made of flat rolled iron or wire A A A, Fig. 1, fastened at each corner by rivets R R R, or other convenient substitutes, each rivet passing through a link at one end of the well-known jack-chain, formed of wire, each link shaped like a twisted figure eight, and partly shown in the enlarged or full-size view, Fig. 2, at B, and at B B B, Fig. 1. These chains, being about six inches long, are provided at the opposite end with an easily-removable fastening, C, Fig. 4, shaped like an eye-pin, bent to one side, which can be inserted into holes made for the purpose between the top hoop and staves of a barrel, K, Fig. 1, in the manner shown at C C C, or, by an equivalent manner, in the open top of any other receptacle, either metallic or of other material, for the purpose of suspending the frame A and allowing it perfect freedom of motion in every direction, laterally these motions being imparted to the frame by means of a stout iron-wire handle, D, Figs. 1, 2, and 3, which is bent into the shape of an eye at one end and flattened quite thin at the other, through which a hole is made, and in this hole the middle of the lowest link of one of the chains plays loosely, as shown at H, Fig. 2, forming a jointed connection peculiarly adapted for the purpose.

A modification of this part of my invention may be made by using a long rivet, bent in the form of an eye at the opposite end from the head, and placed between the ends of the ribs, each of which may be bent so as to loosely inclose the rivet-headed eye-pin P, Fig. 3, these ribs to be fastened together with two or more rivets, r r, thus forming a swivel at the extremity of each chain having all the requirements to produce the joint H, Fig. 2, as shown at N, Fig. 3. The handle D passes out horizontally through a longitudinal hole in the side of the barrel or other receptacle, and is used to move the frame A back and forth, as required, when sifting. The proportions of the sieve to the barrel or other receptacle should be such as to admit of an occasional jarring against the opposite sides, as may be required at the beginning of the operation.

The length of the chains should allow the top of the sieve to drop low enough below the top of the receptacle to clear the under surface of any cover which may be used. The best cover, in most cases, is a piece of cloth stretched and sewed or otherwise fastened across a hoop of suitable size and material, as seen at Fig. 5, which shows the under side of such a cover with the cloth pasted around the hoop.

This improvement in ash-sifters is so devoid of friction that during the operation of sifting the labor is almost entirely expended in doing the work. Also, the frame being very light, as soon as the loose ashes fall through the sieve it enables the operator to increase the rapidity of motions so desirable to clear the coal of adhering ashes; and its triangular shape places the chains in such relative positions as to serve the double purpose of supporting the frame and also keeping and guiding the sieve automatically into a central position.

The sieve is not cumbered with any of the usual appurtenances, such as hooks, handle, rollers, trunnions, pivot, rockers, and slides; but, being entirely detached, it is an obvious advantage during the operation of picking out the clinker or other waste and final emptying.

The cloth-covered hoop, being very light, is the more easily handled, also a cheap and effectual covering to keep down the dust.

The whole apparatus is easily removed from or replaced within the receptacle whenever it becomes necessary.

The simplicity of the whole combination makes it of small cost, and at the same time highly efficient.

I am aware that the following method of using a sieve is not new, viz: Jointed rods or chains are attached to a rim fitting the top of a barrel, and suspending a cross or second rim which receives its motion from an upright handle passing through the upper rim, and connected with the lower rim by joints, making a lever of the first order, this lower rim carrying a round sieve. Therefore,

I claim as my invention—

The combination of the triangular frame A, removable fastenings C at the ends of the guiding and suspending chains B, horizontal handle D passing out through the side of the receptacle, joint H, when made with or without swivel P, and employed with or without cover, substantially as and for the purposes herein described.

JOHN W. BALDWIN.

Witnesses:
GEO. E. PUTNAM,
H. J. HARRINGTON.